3,312,147
FLUID PRESSURE SERVOMOTOR

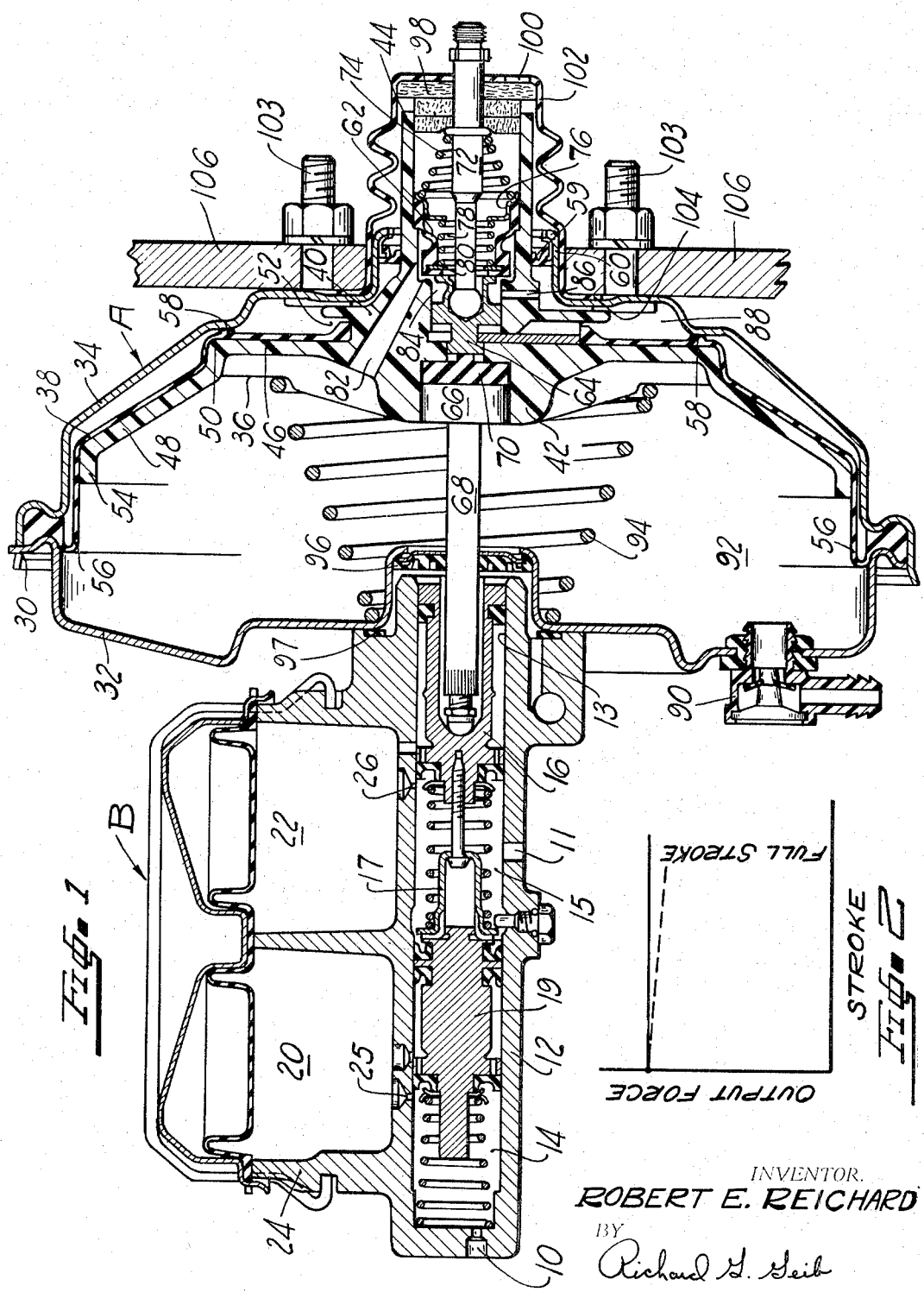

Robert E. Reichard, South Bend, Ind., assignor to The Bendix Corporation, a corporation of Delaware
Filed Mar. 7, 1966, Ser. No. 532,283
3 Claims. (Cl. 91—369)

The present invention relates to fluid pressure servomotors and more particularly to a fluid pressure motor having a stronger and variably effective movable element.

An object of the present invention is the provision of a new and improved fluid pressure servomotor which is simple in design, rugged in its construction, and inexpensive to manufacture.

A more particular object of this invention is the provision of a plastic movable wall having a conical design for maximum strength.

Still another object of this invention is to provide a stop means for a movable wall which is located so as to reduce the transmission of return force through the movable wall.

A still further object of the present invention is the provision of a new and improved fluid pressure servomotor construction wherein its movable wall is constructed to provide maximum strength characteristics in a one piece rigid member with a diaphragm operatively connecting the member to the housing of the servomotor forming a seal with respect to the rigid member without the aid of additional parts or clamping structure, which diaphragm is arranged to vary the effective area of the wall.

The invention resides in certain constructions and combinations and arrangement of parts; and further objects and advantages of the invention will become apparent to those skilled in the art to which its relates from the following description of the accompanying drawing forming a part of this specification, and in which:

FIGURE 1 shows a cross sectional view of a vacuum type servomotor constructed in accordance with the principles of this invention; and FIGURE 2 is a graphical illustration of the improved performance of a servomotor constructed in accordance with the principles of this invention.

One embodiment of my invention is with regard to a vacuum type servomotor used in power operating a master cylinder for a vehicle braking system. With regard to utilizations of this type, which are not to be considered limitative of the types of uses for which my invention may be practically applied, the unit generally comprises a fluid pressure servomotor A which is attached to one end of a master cylinder B of a "split-system" type whose outlets 10 and 11 are connected to separate hydraulic lines of a brake system which its actuates.

The master cylinder B, shown, is of a cast construction with its cast body 12 having an axial bore 13. A spool shaped piston 16 is operatively connected by a spring cage type arrangement 17 to another piston 19 and inserted in the bore 13 to provide fluid pressurizing chambers 14 and 15. These pistons are provided with the usual sealing structures adjacent the opposite ends of the pistons.

The master cylinder B further includes a reservoir 24 having chambers 20 and 22 overlying the pressurizing chambers 14 and 15, respectively, for the purpose of providing make-up fluid for the hydraulic system, should leakage or expansion occur. Small compensating ports 25 and 26 communicate the reservoirs with the chambers 14 and 15 just forwardly of the retracted position of the cup seals on the forward ends of pistons 16 and 19. As the lip of the cup-shaped seals slides over the compensating ports to close it off when the piston 16 is driven forwardly, the chambers 14 and 15 may thereafter develop the pressure for brake actuation. As can be seen, larger ports are provided from the chambers 20 and 22 into the master cylinder bore immediately behind the cup seals to insure that atmospheric pressure exists in this region at all times. Piston 16 is axially bored to receive a force transmitting rod from the fluid pressure servomotor A for pressurizing the chambers 14 and 15, as will be further explained.

The housing of the servomotor is formed by means of front and rear shell stampings 32 and 34, respectively, which are assembled by means of a twist lock connection as at 30 according to the principles set forth in the Price et al. application Serial No. 39,932 filed June 30, 1960, and now Patent No. 3,083,698. According to further principles of the present invention, the power driven element of the servomotor A is formed by a single cast or molded part which is so arranged or constructed as to provide the necessary valve chambers, passages and reaction producing structure. The movable element of the servomotor is completed by means of a diaphragm 38— the outer periphery of which is clamped to the shell in any convenient manner, and the internal portion of which is automatically retained on and provides its own seal with respect to a wall 36 when it is snapped into position thereon.

The part or movable element 36, as it may be termed, is formed to have a central hub 40, a forward boss 42 from the hub and a reaward tubular projection or boss 44. Extending radially from the hub is an annular flange that is, in the type shown, formed with four separate portions including a normal portion 46, an intermediate axial portion 50, an angular portion 48 and a terminal axial portion 54. The diaphragm 38 is fitted over all of these portions of the annular flange and snapped into a recess 52 of the hub 40. The diaphragm projects forwardly of the terminal portion 54 of the element 36 a predetermined distance before folding over into the bead that is inserted between the shells 32 and 34 when they are locked together. The diaphragm is also provided with radially arranged stop bumpers 58 which limit the position of the element 36 with respect to the rear shell 34. The tubular projection 44 is arranged to extend through an opening in the rear shell 34. Prior to the insertion of boss 44 through the opening in the assembly, a seal and bearing support 59 is provided between the periphery of the projection 44 and an annular collar 60 formed with the shell 34 about the opening.

A hollow rubber poppet 62 is positioned against a shoulder internally of the tubular projection 44. Prior to this, however, a valve plunger 64 is positioned ahead thereof within a stepped bore molded or machined in the hub 40. Also, the boss 42 is molded with a stepped bore mounting a head 66 of a force transmitting rod 68 abovementioned and a reaction disc 70 that overlies the smaller diameter of the bore in the boss 42 opening into the stepped bore mounting the valve plunger 64. The valve plunger is affixed to a push rod 72 that may be connected to a brake pedal. Between the push rod 72 and the projection 44 a valve return spring 74 is operatively biased. This valve return spring also holds in place a stamped plate 76 for mounting a valve follow-up spring 78 between it and annular plate 80 formed with and projecting from the forward face of the valve poppet 62. The valve poppet 62 thus controls communication of fluid from a passage 82 formed through the hub 40 and the opening of the boss 44 to a valve chamber 84 therearound. The stepped bore in the hub 40 mounting the valve plunger 64 has a radial passage 86 drilled or molded for communicating the valve chamber to a control chamber 88 behind the assembly of the diaphragm and element 36.

The forward shell 32 has a stamped opening into which a check valve 90 is installed for communicating a fluid pressure source to a chamber 92 ahead of the assembly of the diaphragm 38 and element 36. Within this chamber a return spring 94 is partially compressed, at the assembly of the shells, between the shell 32 and the wall 36 in such a manner as to have an axial line of force substantially aligned with the stops 58 formed on the diaphragm 38. The shell 32 is also provided with an inwardly formed collar having an opening sized for the compression mounting of a seal 96. The seal has lips riding over the surface of the force transmitting rod 68. The master cylinder body 12 is cast with a projection fitting within this collar and with ears that mate with the shell 32 to hold the cylinder to the servomotor. The inner end of the cylinder 12 fits within the collar, and by using a seal 97 placed between the cylinder and shell, contaminants are precluded from reaching the bore 13.

The portion 56 of the diaphragm 38 that projects forwardly of the terminal portion 54 of the movable element 36 is of a length that will allow an inward bulging thereof to abut the forward face of the portion 54 whenever a pressure differential exists across the diaphragm and element. In order to allow this to happen, the juncture line of shells 32 and 34 is chosen to be substantially half the distance or more of the width of the internal area prescribed by the shells 32 and 34. This is of particular significance in the advance this makes over servomotor designs of the past when considering the graphical comparison of FIGURE 2. In this figure the dash-line curve represents the prior art servomotors where the output force falls-off as the servomotor strokes. The solid-line curve shows how this servomotor maintains a substantially constant force throughout the stroke. This is accomplished by increasing the area as the unit strokes to overcome the rate of the return spring in the unit.

Furthermore, the construction of the radial portions of the element 36 is chosen so that the intermediate axially extending portion 50 will provide a cut-off point for the tensile forces in the outer extremities of the diaphragm 38 due to the pressure differential thereacross. In other words, the tensile forces within the diaphragm will not be allowed to stress that portion thereof along the normal surface 46 of the flange of the element 36 to thereby ensure that the intermediate portion thereof will remain within the recess in the hub 40.

In operation, the operator will depress the brake pedal to move the push rod 72 inwardly thereby moving the valve plunger 64 towards the rubber disc 70 with the poppet 62 following its motion. At first, the poppet 62 will abut the hub 40 to terminate communication of the passage 82 to the valve chamber 84 and thereafter the valve plunger 64 will move away from the forward face of the poppet 62 to open the inlet of the tubular projection 44 to the valve chamber 84 so that a differential pressure may be applied to the control chamber 88. The unit shown is of a vacuum suspension type whereby a vacuum source, such as from the intake manifold of an automobile engine, is provided to the check valve 90 and therethrough to the chamber 92. This vacuum normally, prior to actuation of valve 62, passes through the passage 82 into the valve chamber 84 and thence through the radial passage 86 to the control chamber 88. Upon an actuation, such as above mentioned, atmospheric pressure is introduced through the tubular projection 44 via the filter elements 98 that are communicated through an opening 100 in a rubber boot 102 to the atmosphere within the vehicle passenger compartment.

Thus with atmosphere being introduced into the control chamber 88 a pressure differential exists across the diaphragm and element as aforementioned. At first, this pressure differential will tend to bulge the portion 56 of the diaphragm 38 inwardly to overlie the forward face of the terminal portion 54 of the radial flange of the element 36 to reduce the effective area thereof. As greater pressure differential is built up, the movement of the diaphragm and element inwardly will lessen the contact of the portion 56 of the diaphragm with the terminal portion so that the effective area of the assembly is being increased as it is stroked. This will provide greater power for each increment of stroke for the servomotor.

The rubber boot 102 is chosen to overlie the projection 60 of the housing 34 and is provided with radially extending flanges 103. Bolts 104 join the servomotor to a vehicle firewall 106 with flanges 103 between. This will act to prevent noise and contaminants from within the engine compartment of the vehicle from entering the passenger compartment.

As the unit is stroking, the pressure in the master cylinder is conveyed via the head of the force transmitting rod 68 to the disc 70 to extrude the disc against the valve plunger 64 on an ever increasing area. This will provide the operator of the brake pedal with a proportioned "feel."

As the above is but a preferred method of manufacture of a servomotor in accordance with the principles of my invention, I do not intend to be limited by the detailed description thereof. Rather, as will be appreciated by those skilled in the art, I intend to limit the scope of my invention to the appended claims.

I claim:
1. In a fluid pressure servomotor: a housing having a front shell and a rear shell joined together;
   a movable wall within said housing having a hub with a radial flange thereon having a normal portion affixed to said hub, a first axial portion joining said normal portion to an angled portion and a second axial portion adjacent said housing and affixed to said angled portion, said hub having an annular recess adjacent said normal portion and also having a hollow projection rearwardly projecting therefrom that is sealingly and slidably mounted to said housing at an opening through said rear shell, said hub further comprising a chamber that is open to said hollow projection and a boss on the forward side thereof opposite said hollow projection, said boss having an opening therein communicated to said chamber;
   reaction means in said boss including means to mount a force transmitting means to said movable wall to be operated threby and simultaneously develop force in said reaction means;
   valve means in said chamber including a valve operator member carried by said hollow projection and a valve plunger operatively connected to said operator member, said plunger being supported by said hub and operatively arranged to receive reaction forces from said reaction means in said boss;
   a rolling diaphragm having a peripheral bead forming the seal at the juncture of the front shell to the rear shell, and an inner bead about an opening through said diaphragm which is inserted in said recess of said hub, said diaphragm being placed on the flange of said movable wall such that said first axial portion provides a means to deter the effect of tensile forces on said inner bead to maintain a sealing contact of said diaphragm with said wall whereby said housing is divided into first and second variable volume chambers, said diaphragm cooperating with said second axial portion of said flange to provide a means to vary the effective area of said wall as said wall strokes forwardly under the influence of a pressure differential thereacross as scheduled by said valve means; and
   a return spring between said front shell and said movable wall to position the latter so that beads formed on said diaphragm adjacent the first axial portion will be normally against said rear shell and said normal portion is substantially free of spring load on said wall in the released attitude.

2. The structure according to claim 1 wherein said return spring is of a conical type with the larger coils on said wall outwardly of said hub and near said first axial portion so that the line of force from said spring passes through said beads and said radial flange is relieved of spring loads in the released or non-actuated condition of said servomotor.

3. The structure of claim 1 wherein said wall is formed of one piece of plastic.

References Cited by the Examiner

UNITED STATES PATENTS

| | | | |
|---|---|---|---|
| 3,096,689 | 7/1963 | Kytta | 91—376 |
| 3,106,873 | 10/1963 | Cripe | 91—376 |
| 3,150,493 | 9/1964 | Rike | 91—376 |
| 3,249,021 | 5/1966 | Wuellner | 91—376 |

FOREIGN PATENTS 666,181  7/1963  Canada.

MARTIN P. SCHWADRON, *Primary Examiner.*

PAUL E. MASLOUSKY, *Examiner.*